Patented Aug. 24, 1943

2,327,854

UNITED STATES PATENT OFFICE 2,327,854

CRAYON

Per Johan Berggren, New York, N. Y.

No Drawing. Original application October 6, 1937, Serial No. 167,538. Divided and this application September 19, 1940, Serial No. 357,354

4 Claims. (Cl. 106—19)

This invention relates to improvements in a crayon especially prepared for use in making light controlling elements or masks such as are employed in the reproduction of photographic films from negative films.

An object of the invention is the provision of a crayon of this type which is employed for marking upon a ground glass or ground film plate or sheet of the ground side thereof for the purpose of changing the diffusing action of the ground surface at the marked points to a partial or substantially full transparency.

A still further object of the invention is to provide a new material composition in crayon form which may be easily applied to ground glass or ground film at desired areas in different concentrations or amounts and which will not smudge or smear, and is, therefore, relatively permanent under all normal conditions of usage.

Still another object of the invention is the provision of a material composition of this type for such a use which may be applied in a manner so as to eliminate any sharp line of division between the diffusing areas of the plate or film and the transmitting areas produced by the application of the material.

A still further object of the invention is the provision of a material composition of this type for use in the manner stated, by means of which cloud effects and variations in the background density of prints from negative films of scenes may be secured in accordance with the artistic desires of the operator.

These and many other objects as will be apparent from the following specification are successfully secured by means of the invention herein disclosed.

This invention resides substantially in the combination, construction, arrangement and relative location of parts, all in accordance with the description herein.

This application is a division of my United States patent application Serial No. 167,538, filed October 6, 1937, for Photographic diffusing mask and method of preparing the same, which is co-pending.

As is well known in the photographic arts, it is often desirable to produce positive prints from negative film through a diffusing element, first for the purpose of softening or diminishing the harsh lines, and the sharp or strong lines or portions thereof, and second to prevent the reproduction on the positive of the re-toucher's marks on the negative. For example, in the case of a portrait, the negative film frequently shows harsh lines or wrinkles in the face, which it is desired to eliminate in the prints therefrom. This is frequently done by placing a diffusing element over the sensitized positive film and exposing it to the negative film therethrough. The same sort of diffusing element is employed when it is desired to prevent the reproduction in the positive print of the re-toucher's lines applied to the negative film. It is, of course, well known in the art that the re-toucher's lines are the result of the marking out on the negative of undesired lines, such as wrinkles, skin blemishes, and other defects in the skin of the subject.

At the present time there are two generally known methods of modifying such elements. In the one, a clear sheet of transparent material, such as glass, which is placed over the negative film has brushed thereon or otherwise applied thereto, in any suitable manner, as for example by means of a brush, a diffusing film of some suitable material, such for example as a fat, an oil, a wax, a soap, or the like. This diffusing or translucent film is painted onto the glass over the areas to be diffused, which in the case of a portrait would be the skin of the face. This leaves the glass clear and transparent at the eyes, the mouth, the nose, and such other points as are desired.

The difficulty with this method is that, as will be apparent, very sharp lines of division occur between the transparent and the diffusing or translucent areas, which produce highly undesired effects in the positive print taken therethrough. It would be highly desirable if a way were known to effect a softening of the division line between the transparent and the translucent areas, and it would be highly desirable to be able to effect a gradation or shading in the translucent areas. This is not possible by use of the film materials of the type explained above and now known.

A second method which is sometimes employed for modifying diffusing elements of this type consists in applying over the negative a ground glass or film and then applying thereto an oil, a fat, or a wax at desired areas to render it transparent. For example, the areas over the eyes, the mouth, and the nose are painted in or filmed with a fat, a wax, or the like, which renders these areas transparent, leaving the rest of the plate or film translucent because of its ground surface. Here again it is not possible to effect a gradual or shaded line of distinction between the translucent and the transparent areas. The line of demarkation is sharp, which is undesirable for many obvious reasons. Furthermore, all materials heretofore known for the purpose of rendering ground glass plates or films transparent easily smudge and smear, making it extremely difficult to handle the element during the reprinting operations. Furthermore, these materials used to render the ground glass plate or film transparent are hard to handle and apply and require highly skilled technicians in their use.

In either case of the known art it is extremely difficult to correct any errors which the operator may make in the production of the element, so that frequently it is necessary when an error is made to apply a new plate over the negative and start all over again.

A description will now be given of the material and how it is prepared. As explained above, prior to this invention there was no known material for filming clear glass plates or film by rendering ground glass plates or films translucent which would permit of a variation in the light transmitting qualities thereof. Furthermore, it was explained above how such materials as are used for this purpose readily smear and smudge and are hard to apply. The material of this invention may be made in stick or pencil form as distinguished from the liquid forms of the materials commonly used, and may be easily applied. A very important characteristic of this material is that it does not smudge and smear, and will remain on the plate or film for long periods of time without deterioration or destruction, even though it is extensively handled.

Furthermore, this material may be readily removed from the plate when so desired by the use of, among other things, a hydrocarbon solvent such as carbon tetrachloride. It can also be removed wholly or in part by an ordinary rubber eraser.

This material consists principally of two basic substances which are combined in accordance with the following disclosure, namely, carnauba wax and stearic acid. Either of these substances alone to a very uncertain degree will produce the desired effect, but each of them separately has particular defects which make it impractical for the purposes of this invention. The carnauba wax is very hard and requires a lot of effort and hard pressure to work it into the cavities of the ground glass or film. It is also very brittle and chips and breaks easily when worked under pressure. When once applied, it is hard to remove and shade. The stearic acid works easier but is inclined to smudge and smear and does not produce a clean and clear transparency. The result is somewhat like strays in glass and will impair a true optical reproduction of the negative when present. However, several suitable combinations of these two basic materials can be combined which do not have these defects. I have found that very desirable results are secured from the following combination, such as producing a smooth, clean and clear transparency, free from the tendency to smudge and smear, applicable with a minimum of pressure and effort to the ground surface, and which can be easily removed and shaded. This combination comprises, for example, five parts by weight of carnauba wax and one part by weight of triple pressed stearic acid, melted and mixed, and to each ounce of this mixture ninety drops of any suitable vegetable oil, such as olive oil which is a non-drying oil, are added and mixed therein. There may then be added to the mixture, if desired, a suitable transparent dye or pigment, preferably an oil soluble dye, or one soluble in a hydrocarbon. The amount of dye or pigment added is not critical but may be varied, depending upon the various transparencies desired. In other words, in addition to the ability for effecting transparency graduations by shading, further variation may be accomplished by the coloring of the material itself, thereby varying its own light transmitting characteristics.

The amount of vegetable oil may be raised depending upon the oil content of the stearic acid. Therefore, the amount used will vary depending upon the ability of the mixture to absorb it. The controlling factors as to the amount of oil used are that the final combination should give clean partial or complete transparency without too much pressure in application and without leaving an excess of material on the ground surface.

This melted mixture is then poured onto a thin sheet or body of fibrous material, such as cotton, which has preferably been placed in a mould. It is desirable that the mould be warm so that the material thoroughly impregnate the cotton fibres before it is chilled. If desired, a glass or other smooth plate may be placed down on the warm wax to hold the mass into a thin sheet until it has hardened. The sheet is then cut into sticks, which are placed in a mould of the desired size, as for example one having a cavity $\frac{3}{32}$ of an inch to $\frac{3}{16}$ of an inch, and of any desired length. The mould is then placed in an oven so that the wax softens and assumes the form of the mould. It is removed therefrom and then cut into suitable lengths, as for example lengths of one and one-half inches. This provides a wax crayon or pencil having embodied therein a mass of fibres which are employed to give the crayon greater physical strength. It has been found that their presence does not interfere with the application of the wax to the ground glass since the short ends of the fibres as they wear off disappear. Such a crayon can be used in the hand or in a suitable holder therefor. The sharpened end is worked over the areas of the ground glass plate or film to fill in the roughened surface in the manner explained above.

From the above description it will be apparent to those skilled in the art that the principles of this invention, and the methods of procedure may be widely varied without departure from the scope thereof. I do not, therefore, desire to be strictly limited to the disclosure as given for purposes of illustration, but rather to the scope of the claims granted me.

What I claim is:

1. A crayon of the type described, comprising a mixture of substantially five parts by weight of carnauba wax and substantially one part by weight of triple pressed stearic acid, and having approximately ninety drops of olive oil per ounce of mixture incorporated therein.

2. A crayon of the type described, comprising a mixture of substantially five parts by weight of carnauba wax and substantially one part by weight of triple pressed stearic acid, having approximately ninety drops of olive oil per ounce of mixture incorporated therein, and having incorporated therein a mass of fibres.

3. A photographic negative comprising crayon of the type described composed of a mixture of substantially five parts by weight of carnauba wax and substantially one part by weight of triple pressed stearic acid, and having less than ninety drops of a non-drying vegetable oil per ounce of mixture incorporated therein.

4. A photographic negative comprising crayon of the type described composed of a mixture of approximately five parts by weight of carnauba wax and one part by weight of stearic acid.

PER JOHAN BERGGREN.